United States Patent
Sakata et al.

(10) Patent No.: US 6,848,555 B2
(45) Date of Patent: Feb. 1, 2005

(54) ELECTRONIC CONTROLLED COUPLING

(75) Inventors: Takatoshi Sakata, Osaka (JP); Kouji Yoshinami, Osaka (JP); Kazuo Kanazawa, Tokyo (JP); Mamoru Murakami, Tokyo (JP)

(73) Assignees: Koyo Seiko Co., Ltd., Osaka (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/459,600

(22) Filed: Jun. 12, 2003

(65) Prior Publication Data

US 2003/0230461 A1 Dec. 18, 2003

(30) Foreign Application Priority Data

Jun. 14, 2002 (JP) ........................................ 2002-174811
Jun. 14, 2002 (JP) ........................................ 2002-174812

(51) Int. Cl.[7] .......................... F16D 25/12; B60K 17/34
(52) U.S. Cl. .............. 192/70.12; 192/85 R; 192/113.34
(58) Field of Search ............................. 192/70.12, 85 R, 192/85 AA, 85 CA, 103 F, 113.3, 113.34, 113.35, 113.36

(56) References Cited

U.S. PATENT DOCUMENTS

| | | | | |
|---|---|---|---|---|
| 3,576,241 A | * | 4/1971 | Maurice et al. | 192/85 AA |
| 4,984,663 A | * | 1/1991 | Kato | 192/103 F |
| 5,803,197 A | * | 9/1998 | Hara et al. | 180/248 |
| 5,845,756 A | * | 12/1998 | Dairokuno et al. | 192/85 R |
| 2002/0078792 A1 | * | 6/2002 | Kobayashi | 74/665 T |

FOREIGN PATENT DOCUMENTS

| | | | |
|---|---|---|---|
| EP | 0 348 270 A1 | * | 12/1989 |
| JP | 58-91927 | | 6/1983 |
| JP | 9-112592 | | 5/1997 |
| JP | 11-311315 A | * | 11/1999 |
| JP | 2000-346102 | | 12/2000 |

* cited by examiner

Primary Examiner—Rodney H. Bonck
(74) Attorney, Agent, or Firm—McGinn & Gibb, PLLC

(57) ABSTRACT

An electronic controlled coupling including a wet-type multiple disc clutch, a coupling case, a hydraulic chamber, an oil pump, an electric motor, an electric control unit, and a supply passage for supplying hydraulic pressure. The coupling case accommodates the wet-type multiple disc clutch and contains oil. The oil pump driven by the electric motor is connected to the coupling case. The outlet of the oil pump is connected to the hydraulic chamber of the wet-type multiple disc clutch with the supply passage therebetween. The electric control unit controls the speed of rotation of the electric motor through a motor driver so that the pump discharge pressure is equal to an operating pressure required for the wet-type multiple disc clutch. The electronic controlled coupling performs a complete coupling mechanism increasing the durability as a coupling and a compact and simple structure enhancing the flexibility in designing.

13 Claims, 7 Drawing Sheets

ELECTRONIC CONTROLLED COUPLING

The disclosure of Japanese Patent Application No. 2002-174811 filed on Jun. 14, 2002, and Japanese Patent Application No. 2002-174812 filed on Jun. 14, 2002 including the specifications, drawings and abstracts is incorporated herein by reference in its entirety.

BACKGROUND OF THE INVENTION

1. Field of the Invention

The present invention relates to electronic controlled couplings for transmitting torque with a wet-type multiple disc clutch engageable by hydraulic pressure.

2. Description of the Related Art

A technology is known as a power transmission system used for four-wheel drive vehicles in which a coupling mechanism, such as a multiple disc clutch or a viscous coupling, continuously controls a driving force to be distributed to the rear wheels. In particular, four-wheel drive vehicles equipped with an automatic transmission can utilize a hydraulic power source of the automatic transmission; hence, many four-wheel drive vehicles of this, type use a hydraulic wet-type multiple disc clutch.

In contrast, vehicles equipped with a manual transmission do not have their own hydraulic power source; hence, the vehicles may use a coupling that engages a multiple disc clutch by a mechanical driving force. Such a coupling is disclosed, for example, in Japanese Unexamined Patent Application Publication No. 2000-346102. In the coupling of this type, an armature of an electromagnet causes a control clutch, which is a metal multiple disc clutch, to be pressed and engaged, and engaging torque of the control clutch is transmitted to a main clutch, which is a wet-type multiple disc clutch, by a cam mechanism.

In the known coupling described above, the control clutch is operated by electrical signals and a pressure load of the wet-type multiple disc clutch is amplified by a mechanical cam mechanism. This causes problems of heat resistance and wear resistance of the clutch and the controllability of the clutch due to a change in the temperature of a coil.

If a hydraulic wet-type multiple disc clutch is used, hydraulic lubrication and cooling considerably solve the above problems. Since, however, a hydraulic power source is needed, the hydraulic wet-type multiple disc clutch of this type is applicable to limited cases. Moreover, a hydraulic circuit, various pressure-regulating valves, and the like are needed for obtaining a clutch operating pressure, thus causing restricted flexibility in designing.

SUMMARY OF THE INVENTION

Accordingly, it is an object of the present invention to increase the durability of an electronic controlled coupling that includes a hydraulic wet-type multiple disc clutch within a complete coupling mechanism and that has a compact and simple structure and enhances the flexibility in designing.

In accordance with an electronic controlled coupling of the present invention, an oil pump driven by an electric motor is mounted to a case that accommodates a wet-type multiple disc clutch and contains oil. The outlet of the oil pump is connected to a hydraulic chamber of the wet-type multiple disc clutch, with a supply passage for supplying hydraulic pressure therebetween. The supply passage is a one-way closed circuit not having a return path from the hydraulic chamber. Thus, the discharge pressure of the oil pump directly affects the hydraulic chamber of the wet-type multiple disc clutch. The speed of rotation of the electric motor is controlled so that the discharge pressure of the oil pump is equal to an operating pressure required for engagement of the multiple disc clutch.

Other features and advantages of the present invention will become fully apparent from the following detailed descriptions.

BRIEF DESCRIPTION OF THE DRAWINGS

FIG. 1 is a schematic illustration of the structure of an electronic controlled coupling according to the first embodiment;

FIG. 2 is a sectional view of a main portion of a transfer in a transmission and the electronic controlled coupling according to the first embodiment;

FIG. 3 is a sectional view of a main portion of a rear differential and the electronic controlled coupling according to the first embodiment;

FIG. 4 is a flowchart of a process of controlling the electronic controlled coupling;

FIG. 5 is a schematic illustration of the structure of the electronic controlled coupling according to the second embodiment;

FIG. 6 is a sectional view of a main portion of a transfer in a transmission and the electronic controlled coupling according to the second embodiment; and FIG. 7 is a sectional view of a main portion of a rear differential and the electronic controlled coupling according to the second embodiment.

DETAILED DESCRIPTION OF THE PREFERRED EMBODIMENTS

First Embodiment

Figure 1:
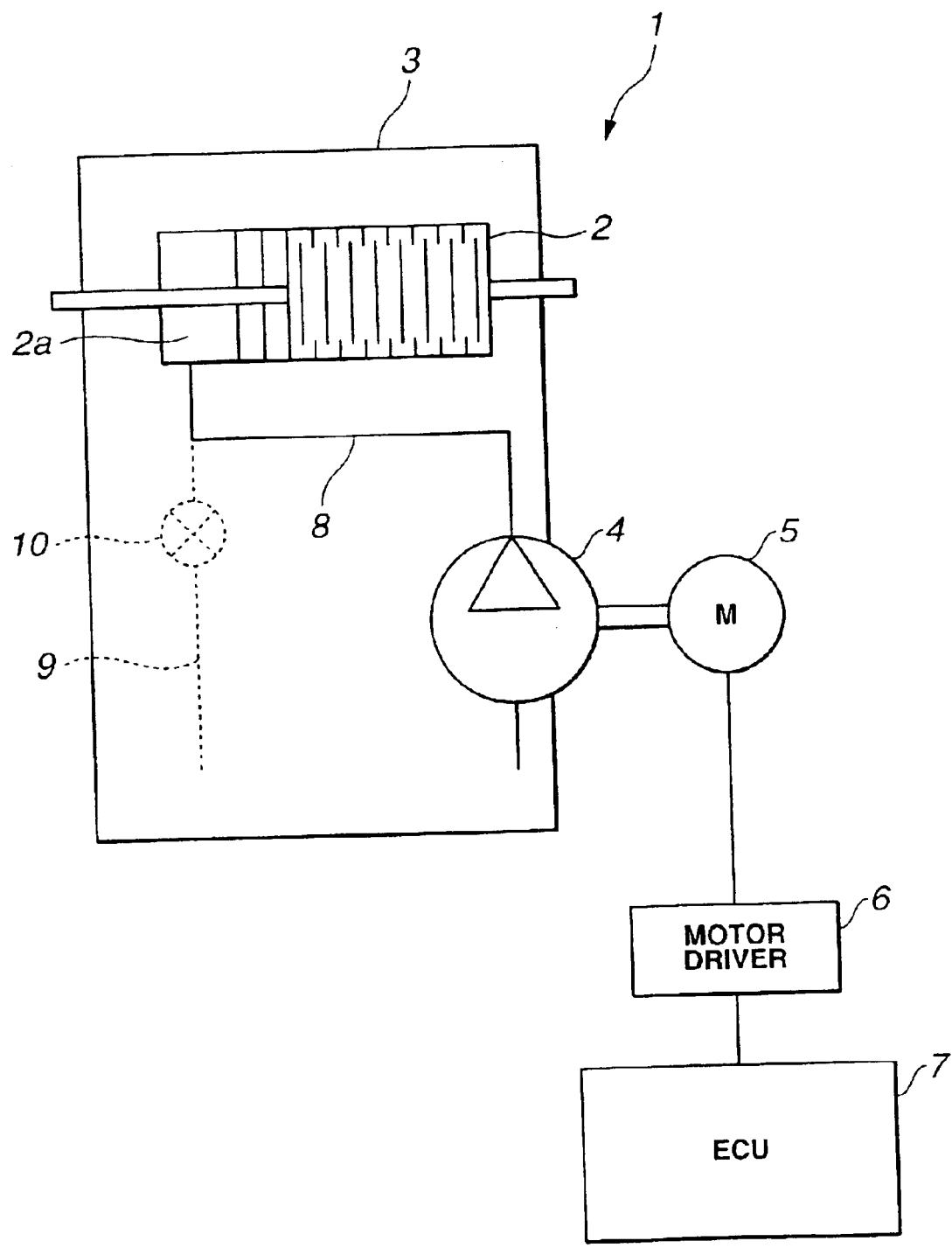
FIGS. 1 to 4 show an electronic controlled coupling according to a first embodiment of the present invention.

FIG. 1 schematically illustrates the structure of an electronic controlled coupling 1 provided in a power transmission system used for a vehicle. The electronic controlled coupling 1 includes a wet-type multiple disc clutch 2, a coupling case 3, an oil pump 4, an electric motor 5 (hereinafter, referred to as a motor 5), a motor driver 6, and an electric control unit 7 (hereinafter, referred to as an ECU 7), and these are integrated together. The wet-type multiple disc clutch 2 transmits driving torque by contacting surfaces of a plurality of alternately deposited driving plates and driven plates. The coupling case 3 accommodates the wet-type multiple disc clutch 2 and contains oil therein. The oil pump 4 is mounted to the coupling case 3, and sucks and pressurizes the oil to directly supply it to the wet-type multiple disc clutch 2. The motor 5 drives the oil pump 4, the motor driver 6 drives the motor 5, and the ECU 7 controls the motor driver 6. The coupling case 3 contains the oil for an operating hydraulic pressure and lubrication for the wet-type multiple disc clutch 2.

The outlet of the oil pump 4 is connected to a hydraulic chamber 2a, with a supply passage 8 for supplying hydraulic pressure therebetween. The hydraulic chamber 2a is provided for engaging the wet-type multiple disc clutch 2. Driving the oil pump 4 by rotation of the motor 5 causes the oil in the coupling case 3 to be sucked and pressurized. Thus, the discharge pressure of the oil pump 4 directly affects the hydraulic chamber 2a of the wet-type multiple disc clutch 2.

The supply passage 8, guiding the oil discharged from the oil pump 4 to the wet-type multiple disc clutch 2, is a one-way closed circuit not having a return path from the hydraulic chamber 2a. The engagement of the wet-type multiple disc clutch 2 is controlled by only adjusting the discharge pressure of the oil pump 4 under the control of the speed of rotation of the motor 5. Thus, a pilot circuit, a return circuit, and various regulating valves, such as a pressure-regulating valve and a relief valve, for pressure regulation are not needed.

The ECU 7 controls the rotation of the motor 5 through the motor driver 6. The ECU 7 determines a running condition on the basis of signals from various sensors (not shown), such as a wheel speed sensor and an acceleration sensor, in order to determine transmission torque suitable for the resulting running condition. Then, the ECU 7 controls the speed of rotation of the motor 5 so that the discharge pressure of the oil pump 4 is equal to an operating pressure of the wet-type multiple disc clutch 2 required for generating the transmission torque.

When the wet-type multiple disc clutch 2 is disengaged, the motor 5 is controlled to be in a standby mode with a rotation speed set in advance so that the discharge pressure of the oil pump 4 is less than an operating pressure for clutch engagement, for ensuring startup response. In order to engage the wet-type multiple disc clutch 2, the ECU 7 increases the rotation speed of the motor 5 to a rotation speed that corresponds to a pump discharge pressure for generating required transmission torque.

Since the oil discharged from the oil pump 4 flows to a dead end at the hydraulic chamber 2a of the wet-type multiple disc clutch 2, relatively high loads may be applied to the oil pump 4 and the motor 5. If, for example, a gear pump is used as the oil pump 4, setting a relatively larger side clearance in advance reduces the pump load. Also, it is desirable that a brushless motor may be used as the motor 5 for durability. Moreover, use of a motor that is available under oil allows an enhanced flexibility in designing and a more compact structure.

The transition from an engaged state to a disengaged state of the wet-type multiple disc clutch 2 requires some period of time for a reduction in the discharge pressure of the oil pump 4, resulting in possibility of a response delay in disengagement of the wet-type multiple disc clutch 2. In order to overcome this, it is desirable that a release passage 9 may be provided in the middle of the supply passage 8 and that an on-off valve 10 which is opened and closed by an electromagnetic solenoid or the like may be provided in the middle of the release passage 9, as indicated by the dotted lines in FIG. 1. When the wet-type multiple disc clutch 2 is disengaged, opening the on-off valve 10 in accordance with an instruction from the ECU 7 allows an improved release performance. Alternatively, reverse rotation of the motor 5 suppresses the response delay, thus drastically improving the release performance.

Figure 2:
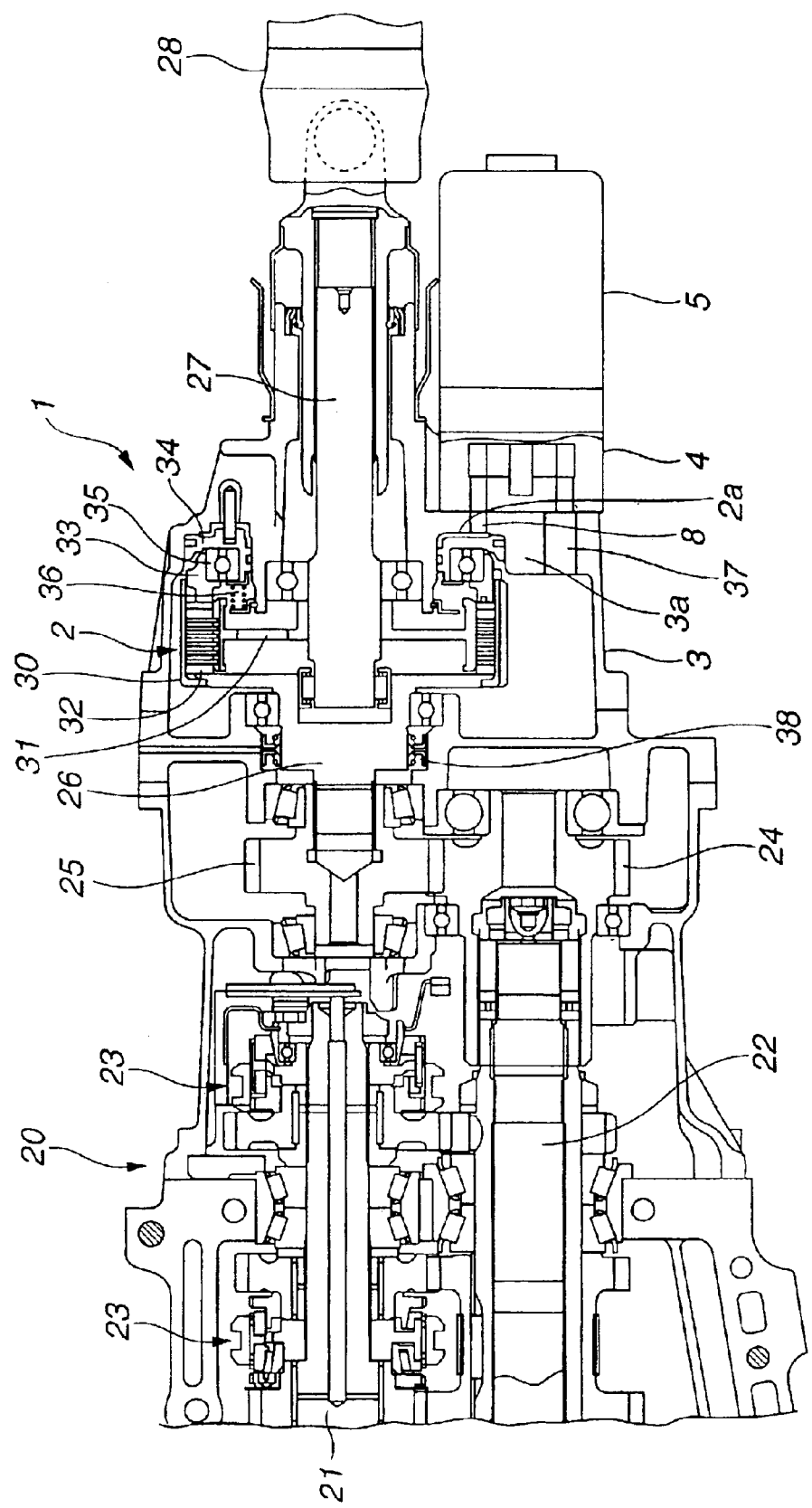

FIG. 2 shows an example in which the electronic controlled coupling 1 described above is applied for a four-wheel drive vehicle equipped with a manual transmission 20 (hereinafter, referred to as a transmission 20). The electronic controlled coupling 1 is provided, as a transfer, at the rear of the transmission 20.

In the transmission 20, a synchromesh mechanism 23 allows transmission gears idling on a main shaft 21 connected to an output shaft of an engine through a clutch (not shown) to be engaged with transmission gears on a drive pinion shaft 22 in accordance with gear change operation.

The driving force of the engine transmitted to the main shaft 21 is transmitted to the front wheels from a front differential (not shown) via the drive pinion shaft 22. The driving force is also transmitted to a transfer driven gear 25 via a transfer driving gear 24 coupled to the rear end of the drive pinion shaft 22. The transfer driven gear 25 is connected to a clutch shaft 26, which is an input shaft of the electronic controlled coupling 1, and a rear wheel output shaft 27, which is an output shaft of the electronic controlled coupling 1, is connected to a rear differential (not shown) with a propeller shaft 28 therebetween. Accordingly, the driving force is distributed to the rear wheels.

Oil for operating and lubricating the wet-type multiple disc clutch 2 is contained in the coupling case 3 functioning as a transfer case. The wet-type multiple disc clutch 2 in the coupling case 3 includes a clutch drum 30 extending from the clutch shaft 26 and having a larger diameter than that of the clutch shaft 26, a clutch hub 31 coupled to a circumference of the rear wheel output shaft 27, a clutch plate unit 32 which is optionally engaged or disengaged between the clutch drum 30 and the clutch hub 31, and a piston 34 pressing the clutch plate unit 32 with a pressing member 33. The hydraulic chamber 2a is provided behind the piston 34. The hydraulic chamber 2a allows the wet-type multiple disc clutch 2 to be engaged by moving the piston 34 in the axial direction to transmit pressing force to the pressing member 33.

A bearing 35 is disposed between the pressing member 33 and the piston 34. The bearing 35 transmits pressing force to the rotating pressing member 33 by linear movement of the piston 34. A return spring 36 urges the clutch plate unit 32 in the disengaging direction against the pressing force of the piston 34.

An integrated pump unit of the oil pump 4 and the motor 5 is attached to a side wall unit 3a provided below the rear wheel output shaft 27 of the coupling case 3. A suction passage 37 for sucking oil and the supply passage 8 are arranged within the side wall unit 3a. The suction passage 37 is connected to the inlet of the oil pump 4 and is opened to the coupling case 3. The supply passage 8 directly connects an outlet of the oil pump 4 to the hydraulic chamber 2a of the wet-type multiple disc clutch 2.

The transmission 20 and the electronic controlled coupling 1, functioning as a transfer, are separated from each other by an oil seal 38 arranged on the circumference of the clutch shaft 26. Thus, the oil in the transmission 20 is separated from the oil in the electronic controlled coupling 1. The same type of oil can be used in the transmission 20 and the electronic controlled coupling 1. Alternately, the oil used in the electronic controlled coupling 1 may be different from the oil used in the transmission 20. Oil used in the electronic controlled coupling 1 may be selected in consideration of the characteristics of the wet-type multiple disc clutch 2 and the oil pump 4.

In the electronic controlled coupling 1, functioning as a transfer, as described above, the rotation of the motor 5 is controlled by the ECU 7 so that transmission toque is generated on the basis of a running condition of a vehicle, a condition of a road surface, and the like. Thus, the torque distribution ratio of front wheels to rear wheels is variable between 100:0 (clutch is disengaged) and 50:50 (clutch is engaged).

Variably controlling the transmission torque by controlling the speed of rotation of the motor 5 pressurizes and transfers the oil discharged from the oil pump 4 directly to the hydraulic chamber 2a of the wet-type multiple disc clutch 2 so that the discharge pressure of the oil pump 4 is equal to a clutch operating pressure. Thus, controllability of the wet-type multiple disc clutch 2 can be improved without being affected by various hydraulic circuits, pressure-regulating valves, and the like for obtaining a clutch operating pressure. Moreover, oil contained in the coupling case 3 lubricates and cools each portion, thus improving the durability of the electronic controlled coupling 1.

Figure 3:
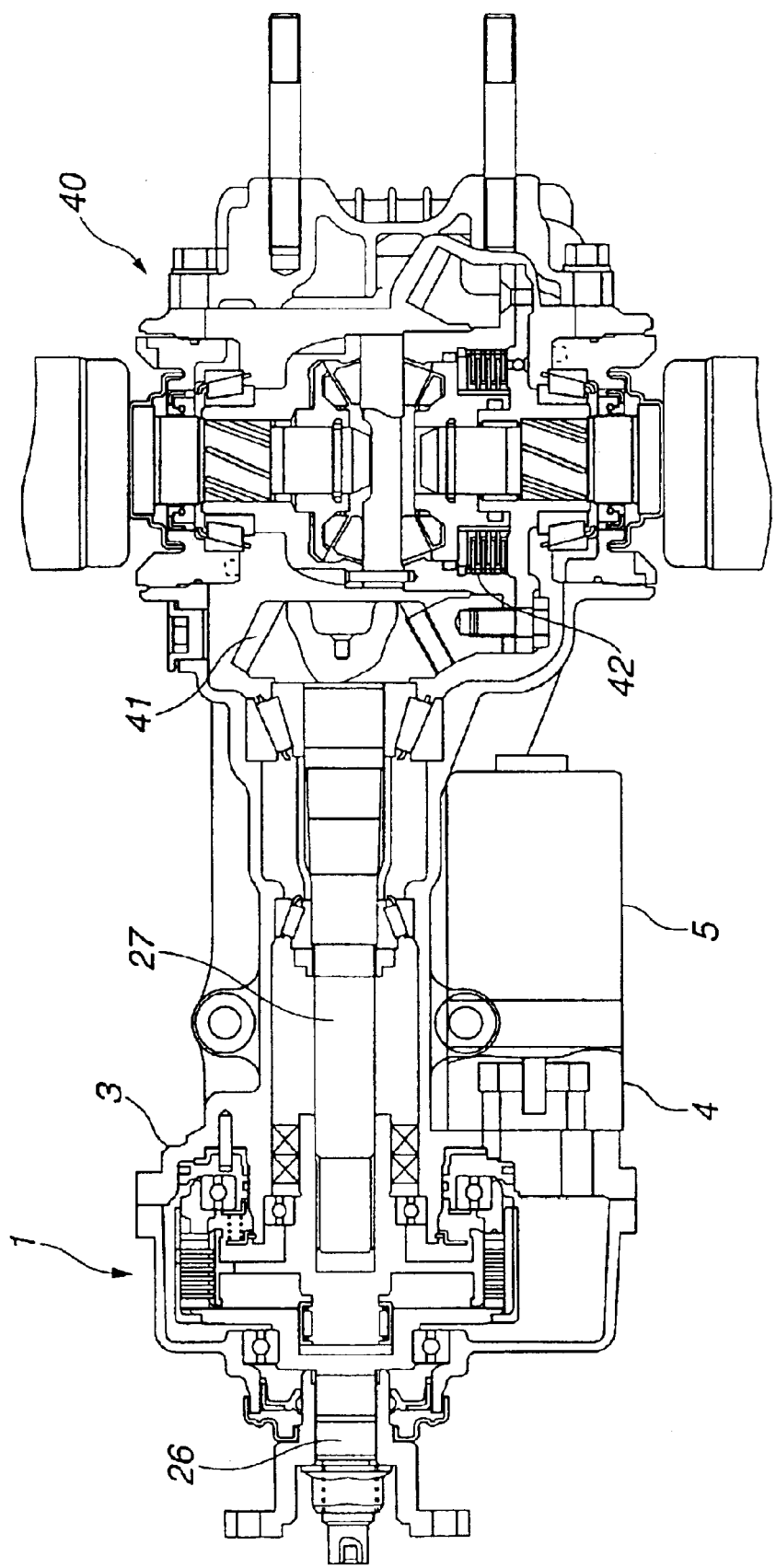

FIG. 3 shows an example in which the electronic controlled coupling 1 is provided between the propeller shaft and a rear differential 40. Referring to FIG. 3, the coupling case 3 of the electronic controlled coupling 1 extends backwards to function as part of a case for the rear differential 40. The clutch shaft 26, which is an input shaft of the electronic controlled coupling 1, is connected to the rear end of the propeller shaft, and the rear wheel output shaft 27, which is an output shaft of the electronic controlled coupling 1, is connected to the rear differential 40 accommodating a viscous coupling 42, with a bevel gear 41 therebetween. The internal structure of the electronic controlled coupling 1 is basically similar to the structure of the transfer described above with the exception that the structure around the output shaft slightly differs.

Figure 4:
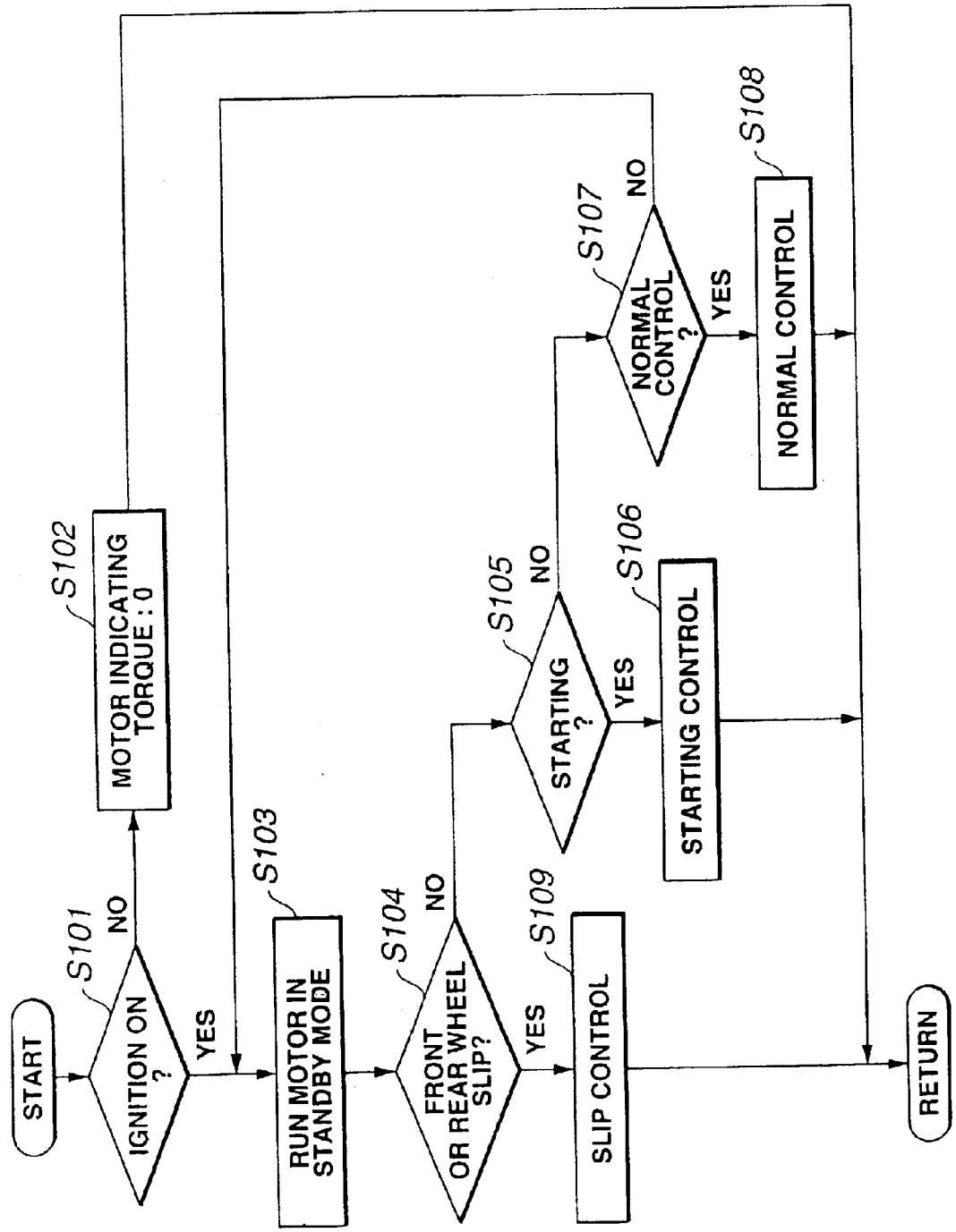

A process of a program executed by the ECU 7 controlling the electronic controlled coupling 1 will now be described with reference to a flowchart shown in FIG. 4.

In step S101, it is determined whether or not an ignition switch (not shown) is turned on. Step S101 is provided for setting the electronic controlled coupling 1 to a standby mode prior to running of a vehicle. It may be determined that the electronic controlled coupling 1 is prepared for a standby mode, for example, by an "on" signal indicating that a vehicle door is opened, instead of by an "ignition-on" signal.

When it is determined that the switch is off in step S101, motor indicating torque, which is indication torque for the motor 5, is set to zero in step S102. Thus, the electronic controlled coupling 1 is set to a non-operating state (clutch is disengaged). When it is determined that the switch is on in step S101, the process proceeds to step S103 to run the motor 5 in a standby mode with a rotation speed set in advance.

In step S104, it is determined whether or not front or rear wheel slip is caused on the basis of signals from the wheel speed sensor for the front and rear wheels. When slip is not caused, it is determined whether or not the vehicle is in a starting mode in step S105. When it is determined that the vehicle is in the starting mode, starting control is performed in step S106. In the starting control, for example, the indication torque for the motor 5 is determined in accordance with the degree of engine throttle opening. For slow starting, the discharge pressure of the oil pump 4 is increased relatively moderately so that the clutch engaging pressure is gradually increased. For quick starting, the discharge pressure of the oil pump 4 is rapidly increased so that the clutch is quickly engaged.

When it is determined that the vehicle is not in the starting mode in step S105, the process proceeds to step S107 to determine whether or not normal control is required. When it is determined that the normal control is not required, the process returns to step S103. When it is determined that the normal control is required, the process proceeds to step S108 to perform the normal control. In the normal control, for example, the indication torque for the motor 5 is determined on the basis of the degree of throttle opening and the speed of the vehicle, and the discharge pressure of the oil pump 4 is controlled to a clutch operating pressure for generating transmission torque suitable for the running state.

When it is determined that the front or rear wheel slip is caused in step S104, the process proceeds to step S109 to perform the slip control. In the slip control, for example, when front wheel slip is caused, the indication torque for the motor 5 is increased in accordance with the degree of the slip in order to adjust the discharge pressure of the oil pump 4, that is, the clutch engaging pressure, thus suppressing the front wheel slip.

Accordingly, the electronic controlled coupling 1 according to the embodiment includes the integrated wet-type multiple disc clutch 2, the oil pump 4, and the motor 5. The oil pump 4 is driven by the motor 5, and the discharge pressure of the oil pump 4 is adjusted by controlling the rotation speed of the motor 5. The clutch engaging pressure is controlled through the resulting discharge pressure of the oil pump 4. The electronic controlled coupling 1 has a compact structure and is mechanically complete as a coupling, thus enhancing flexibility in designing. Therefore, the electronic controlled coupling 1 is readily applicable to power transmission systems used for vehicles. Particularly, the electronic controlled coupling 1 is effectively used for manual transmission-equipped vehicles without their own hydraulic power source.

In the electronic controlled coupling 1 according to the embodiment, hydraulic lubrication is readily performed and heat resistance of the clutch is improved. Moreover, the clutch operating pressure can be controlled by the control of the rotation speed of the motor 5. Thus, a hydraulic circuit and various regulating valves for obtaining the clutch operating pressure are not needed, thus reducing the cost.

Second Embodiment

An electronic controlled coupling according to a second embodiment of the present invention will now be described. Similar components as in the first embodiment are referred to with the same reference numerals, and the descriptions of those similar components will not be repeated here.

Figure 5:
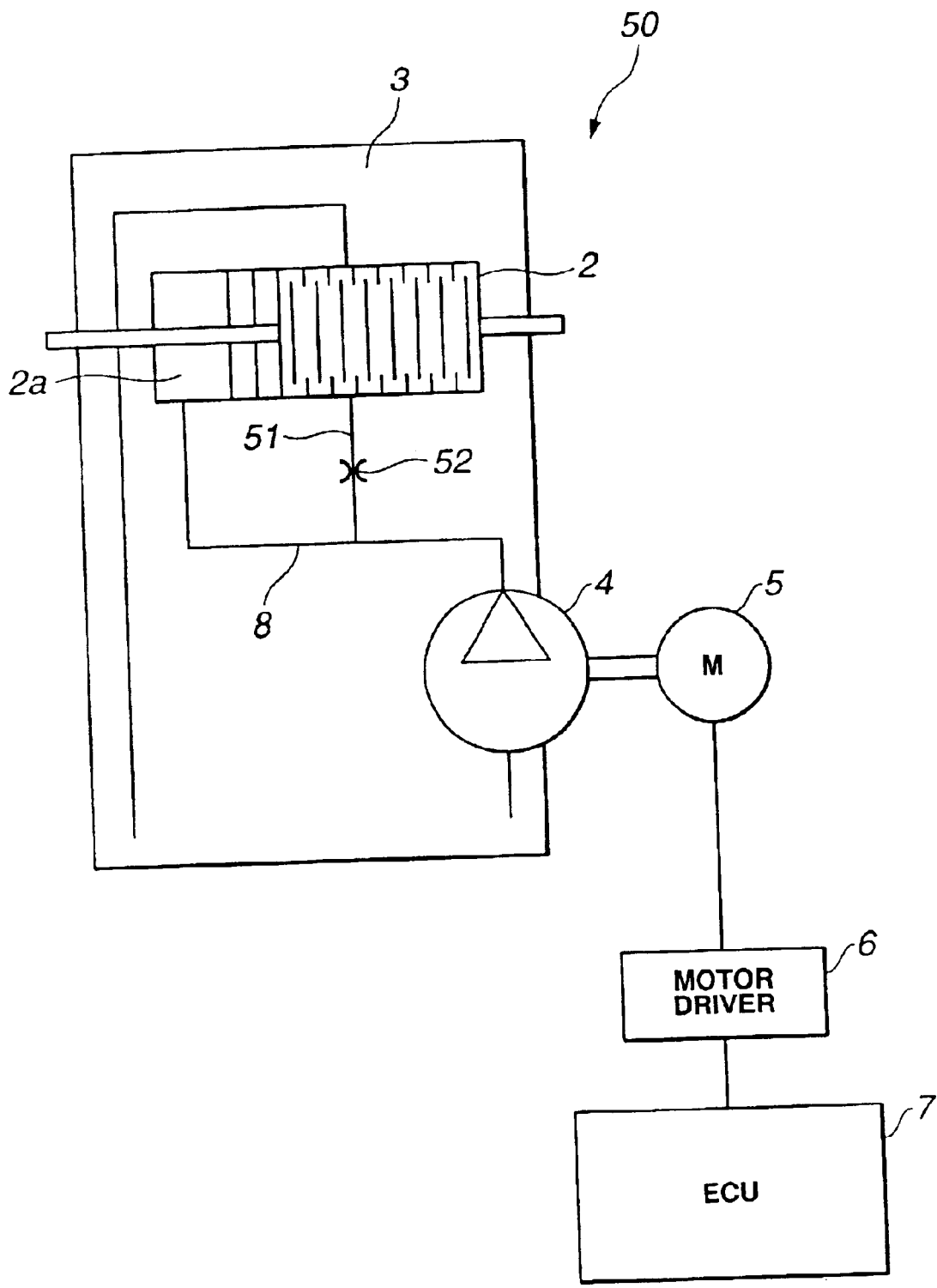
FIGS. 5 to 7 show an electronic controlled coupling according to a second embodiment of the present invention.

Referring to FIG. 5, an electronic controlled coupling 50 includes a cooling oil passage 51 for supplying cooling oil in order to effectively cool the wet-type multiple disc clutch 2. The cooling oil passage 51 branches off from the midstream of the supply passage 8 for supplying hydraulic pressure. Accordingly, the wet-type multiple disc clutch 2 is forcibly cooled by the oil from the cooling oil passage 51. The cooling oil passage 51 has an orifice 52 in the middle thereof, so that the amount of the oil for forcibly cooling the wet-type multiple disc clutch 2 is limited to the minimum necessary. The orifice 52 is not necessarily provided. If the minimum amount of the cooling oil required for cooling the wet-type multiple disc clutch 2 can be ensured without influencing the clutch operation, the orifice 52 may be omitted.

Figure 6:
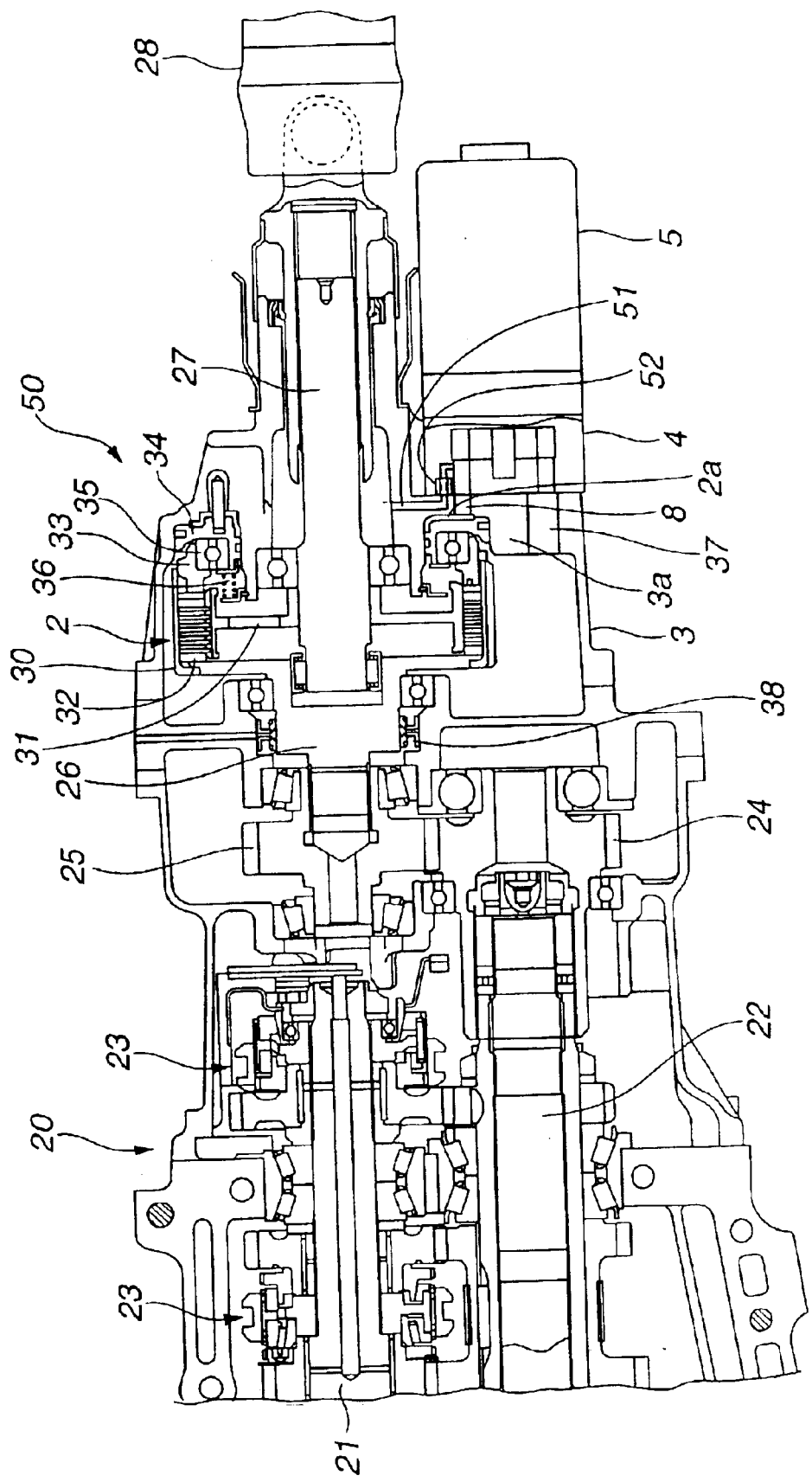

FIG. 6 shows an example in which the electronic controlled coupling 50 according to the second embodiment is applied for a four-wheel drive vehicle equipped with the manual transmission 20, as in the first embodiment. The electronic controlled coupling 50 is provided, as a transfer, at the rear of the transmission 20. The cooling oil passage 51 branches off from the supply passage 8 that connects the outlet of the oil pump 4 to the hydraulic chamber 2a of the wet-type multiple disc clutch 2. The cooling oil passage 51 is opened to a space around the circumference of the rear wheel output shaft 27 in the coupling case 3. The orifice 52 is provided in the cooling oil passage 51.

Figure 7:
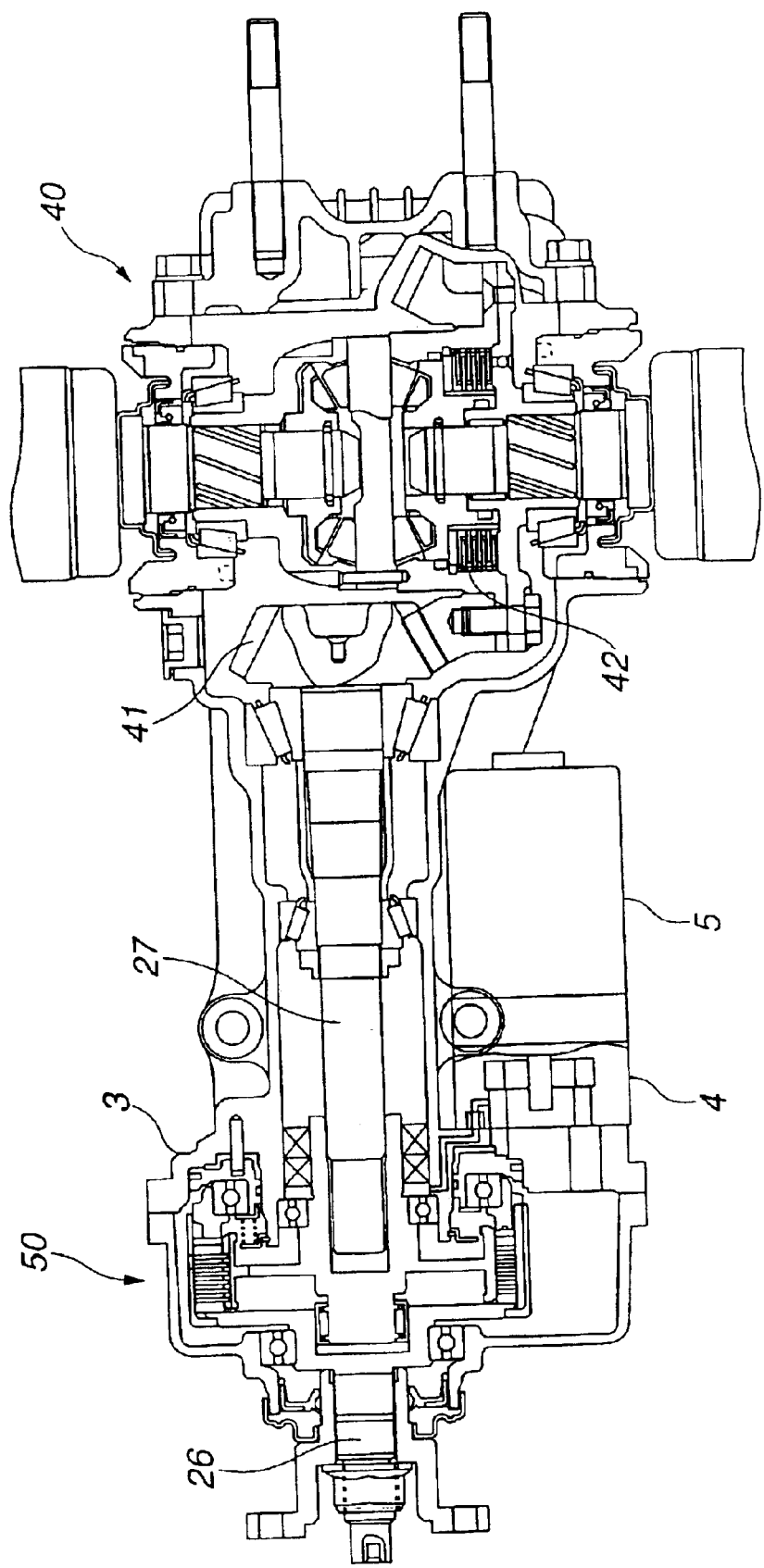

FIG. 7 shows an example in which the electronic controlled coupling 50 is provided between the propeller shaft and the rear differential 40, as in the first embodiment. The internal structure of the electronic controlled coupling 50 is basically similar to the structure of the transfer described above with the exception that the structure around the output shaft and the position of the opening of the cooling oil passage 51 slightly differ from those of the transfer.

The ECU 7 controls the electronic controlled coupling 50 as in the first embodiment.

The electronic controlled coupling 50 according to the second embodiment has an operation and beneficial effects similar to those of the electronic controlled coupling 1 according to the first embodiment. Furthermore, in the electronic controlled coupling 50 according to the second embodiment, the wet-type multiple disc clutch 2 is forcibly cooled through the cooling oil passage 51. Thus, the wet-type multiple disc clutch 2 is effectively cooled. Accordingly, the heat resistance of the clutch is further improved.

As described above, the electronic controlled coupling 1 according to the present invention that includes a hydraulic wet-type multiple disc clutch within a complete coupling mechanism increases the durability as a coupling. Also, the electronic controlled coupling 1 has a compact and simple structure and enhances the flexibility in designing.

In the present invention, it is obvious that widely different embodiments may be made without departing from the spirit and scope of the present invention. The present invention is not limited to the specific embodiments thereof except as defined in the appended claims.

What is claimed is:

1. An electronic controlled coupling comprising:
   a wet-type multiple disc clutch, which a case containing oil accommodates, engageable by hydraulic pressure of the oil that is supplied to a hydraulic chamber;
   an oil pump connected to the case that sucks the oil contained in the case and pressurizes the oil to be supplied to the hydraulic chamber;
   a supply passage for supplying hydraulic pressure provided in the case as a passage for directly connecting an outlet of the oil pump to the hydraulic chamber, the supply passage being a one-way closed circuit not having a return path from the hydraulic chamber such that the discharge pressure of the oil pump may directly affect the hydraulic chamber; and
   control means for controlling the speed of rotation of an electric motor, which drives the oil pump, so that the discharge pressure of the oil pump is equal to an operating pressure required for the wet-type multiple disc clutch.

2. The electronic controlled coupling according to claim 1, further comprising:
   a release passage provided in the middle of the supply passage; and
   an on-off valve provided in the release passage, the on-off valve being opened when the wet-type multiple disc clutch is disengaged.

3. An electronic-controlled coupling according to claim 1, wherein a speed of rotation of the electric motor is controlled from a standby state in which the discharge pressure of the oil pump is lower than an operating pressure for clutch engaging such that the discharge pressure of the oil pump may be equal to the operating pressure required for the wet-type multiple disc clutch.

4. An electronic-controlled coupling according to claim 1, wherein the electric motor is provided integrally with the oil pump as a motor available under oil.

5. An electronic-controlled coupling according to claim 1, wherein said electronic controlled coupling transmits torque through the wet-type multiple disc clutch.

6. An electronic-controlled coupling according to claim 1, further comprising:
   a cooling oil passage for supplying cooling oil in order to cool the wet-type multiple disc clutch, the cooling oil passage being provided in the case such as to branch off from the supply passage.

7. An electronic-controlled coupling according to claim 6, further comprising:
   an orifice in the center of said cooling oil passage, said orifice limiting an amount of the cooling oil to a minimum.

8. An electronic-controlled coupling according to claim 1, wherein engagement of the wet-type multiple disc clutch is controlled by adjusting the discharge pressure of the oil pump.

9. An electronic controlled coupling comprising:
   a wet-type multiple disc clutch, which a case containing oil accommodates, engageable by hydraulic pressure of the oil that is supplied to a hydraulic chamber;
   an oil pump connected to the case, that sucks the oil contained in the case and pressurizes the oil to be supplied to the hydraulic chamber;
   a supply passage for supplying hydraulic pressure provided in the case as a passage for directly connecting an outlet of the oil pump to the hydraulic chamber, the supply passage being a one-way closed circuit not having a return path from the hydraulic chamber such that the discharge pressure of the oil pump may directly affect the hydraulic chamber;
   a cooling oil passage for supplying cooling oil in order to cool the wet-type multiple disc clutch, the cooling oil passage being provided in the case such as to branch off from the supply passage; and
   control means for controlling the speed of rotation of an electric motor, which drives the oil pump, so that the discharge pressure of the oil pump is equal to an operating pressure required for the wet-type multiple disc clutch.

10. An electronic controlled coupling according to claim 9, further comprising:
    an orifice provided in the cooling oil passage.

11. An electronic-controlled coupling according to claim 9, wherein the speed of rotation of the electric motor is controlled from a standby state in which the discharge pressure of the oil pump is lower than an operating pressure for clutch engaging such that the discharge pressure of the oil pump may be equal to the operating pressure required for the wet-type disc clutch.

12. An electronic-controlled coupling according to claim 9, wherein the electric motor is provided integrally with the oil pump as a motor available under oil.

13. An electronic-controlled coupling according to claim 9, wherein said electronic controlled coupling transmits torque through the wet-type multiple disc clutch.

* * * * *